United States Patent [19]

Lamar et al.

[11] Patent Number: 4,506,514
[45] Date of Patent: Mar. 26, 1985

[54] CONTROLLING ENERGY IN AN AIR-CONDITIONING SYSTEM

[75] Inventors: Roger H. Lamar; Robert A. Davis, both of Winston-Salem, N.C.

[73] Assignee: The Bahnson Company, Winston-Salem, N.C.

[21] Appl. No.: 605,684

[22] Filed: Apr. 30, 1984

[51] Int. Cl.³ .............................................. B01F 3/02
[52] U.S. Cl. ......................................... 62/91; 165/16; 236/44 C; 236/49
[58] Field of Search ................. 165/16, 20; 236/44 C, 236/49; 62/171, 91

[56] References Cited

U.S. PATENT DOCUMENTS 4,362,026 12/1982 Miller ................................. 165/16 X
4,399,864 8/1983 Lamar ................................. 230/44 C Primary Examiner—William E. Wayner
Attorney, Agent, or Firm—Dann, Dorfman, Herrell & Skillman

[57] ABSTRACT

A system for minimizing the energy consumption in a central air conditioning unit incorporating a refrigeration unit which is normally in operation to supplement or substitute for the cooling effect of outside air. The system employs sensor to sense the enthalpy of the return air entering the unit from the work space, the outside air entering the unit from the outside, and the washer air discharged into the work space from the unit, and controls the operation of the unit in accordance with the relative levels of enthalpy at these points. The energy content of the discharged washer air may be modified by modulating dampers controlling the proportion of outside and recirculated air, and also by modulating the washer which provides evaporative cooling and, in addition, cooling by refrigeration. The controls keep the outdoor air dampers normally closed when the enthalpy of the outdoor air is higher than the enthalpy of the return air and keep the outdoor air dampers normally opened when the enthalpy of the outside air is less than the enthalpy of the return air. Regulating means provide auxiliary signals to modulate the dampers to avoid adversely affecting the conditioning effect of the washer air in the work area, and also to enable the continued operation of the refrigeration unit without damage when the system would otherwise call for operating the unit at less than the minimum safe operating load.

17 Claims, 4 Drawing Figures

CONTROLLING ENERGY IN AN AIR-CONDITIONING SYSTEM

FIELD OF THE INVENTION

The present invention relates to air conditioning systems and more particularly to an air conditioning system in which recirculated air and/or fresh air is cooled or humidified in an air washer prior to being reintroduced into the work area. More particularly the present invention relates to an improved control system in a central air conditioning unit for conserving energy while regulating the temperature and humidity of the air introduced into the work area to achieve the desired temperature and humidity within the work area.

BACKGROUND OF THE INVENTION

One conventional system for controlling the temperature and humidity of the air introduced into the work space in an air conditioned plant consists of controlling the conditioning of the air in a central unit by first reducing the temperature of the air to a temperature corresponding to the dewpoint temperature desired in the work space, thus saturating the air with moisture at that temperature, and thereafter adding sensible heat to the air so as to elevate the temperature to the dry bulb temperature desired in the space. While such a method facilitates the control of the humidity of the air entering the conditioned space from the central unit, it uses unnecessary energy when it is necessary to first cool the air to a temperature corresponding to the dewpoint temperature and thereafter reheat the air.

In order to conserve energy, the control shown in U.S. Pat. No. 4,399,864 provides an improved control system for a central unit in which the air introduced into the work space is a controlled mixture of fresh air and secondary air which is subjected to a controlled humidification prior to introduction into the work space. The mixture of secondary air and fresh air is controlled in conjunction with the washer spray to insure that the air is of a sufficiently low humidity to provide the desired humidity in the work space. Sensible heat is provided to the mixture, when needed, either by heating the secondary air prior to its mixture with primary air or by heating the mixture. The control is effected by sensing one property or condition of the introduced air, e.g. the wet bulb temperature, and modulating the controls to effect the necessary changes in that property to maintain the desired temperature and humidity in the room.

The control of the room conditions in this manner is generally satisfactory, but when the ambient conditions vary to a large degree, such control tends to be inefficient and wasteful of energy.

The changes in the ambient conditions include variations in the amount of sensible heat which is added to the air in the work space to be conditioned, which may occur when a large number of heat-producing machines are started or stopped, when the lighting load is substantially altered, or when the heat-generating components in the air conditioned space are shut down, for example between operating shifts. The ambient conditions may also be affected by changes in the outdoor climate. Wide variations in the outdoor air may require substantial modulation of the central air unit in order to accommodate to the changes in the outdoor air conditions. Furthermore, after periods of use, different washer systems in the central unit may operate with different degrees of efficiency and cause a cumulative variation in the effectiveness of a particular unit.

SUMMARY OF THE INVENTION

The present invention provides a system for controlling the room conditions precisely to the desired temperature and humidity in a highly efficient and energy-conserving fashion.

More specifically the present invention provides a system in which the enthalpy of the air at various points in the central air conditioning system is sensed, and in response to changes in the relative enthalpy between different points, the controls in the central air conditioning unit of the system are modulated in a highly efficient and effective manner.

Even more specifically the present invention senses the enthalpy of the air entering the central conditioning unit from the room, the enthalpy of the outside air, and the enthalpy of the air discharged into the room after passage through the central air conditioning unit. The controls in the central unit are modulated in accordance with the relationship between the sensed values of the enthalpy at these points.

In multiple-washer unit systems, the present invention, by sensing the enthalpy of the air exiting from each washer unit in the central unit, permits variation of each washer unit to compensate for the differing operational characteristics of that unit in comparison to the other units in the system.

The invention contemplates sensing the enthalpy at each of three points in the central unit and comparing the values in order to establish different modes of control in response to the relationship between the sensed values. Enthalpy of moist air increases with the dry bulb temperature of the air and also with the absolute moisture content of the air and is a convenient tool when designing the controls of an air conditioning system.

BRIEF DESCRIPTION OF THE DRAWINGS

Preferred embodiments of the invention are illustrated in the drawings, wherein.

DESCRIPTION OF THE PREFERRED EMBODIMENTS

Figure 1:
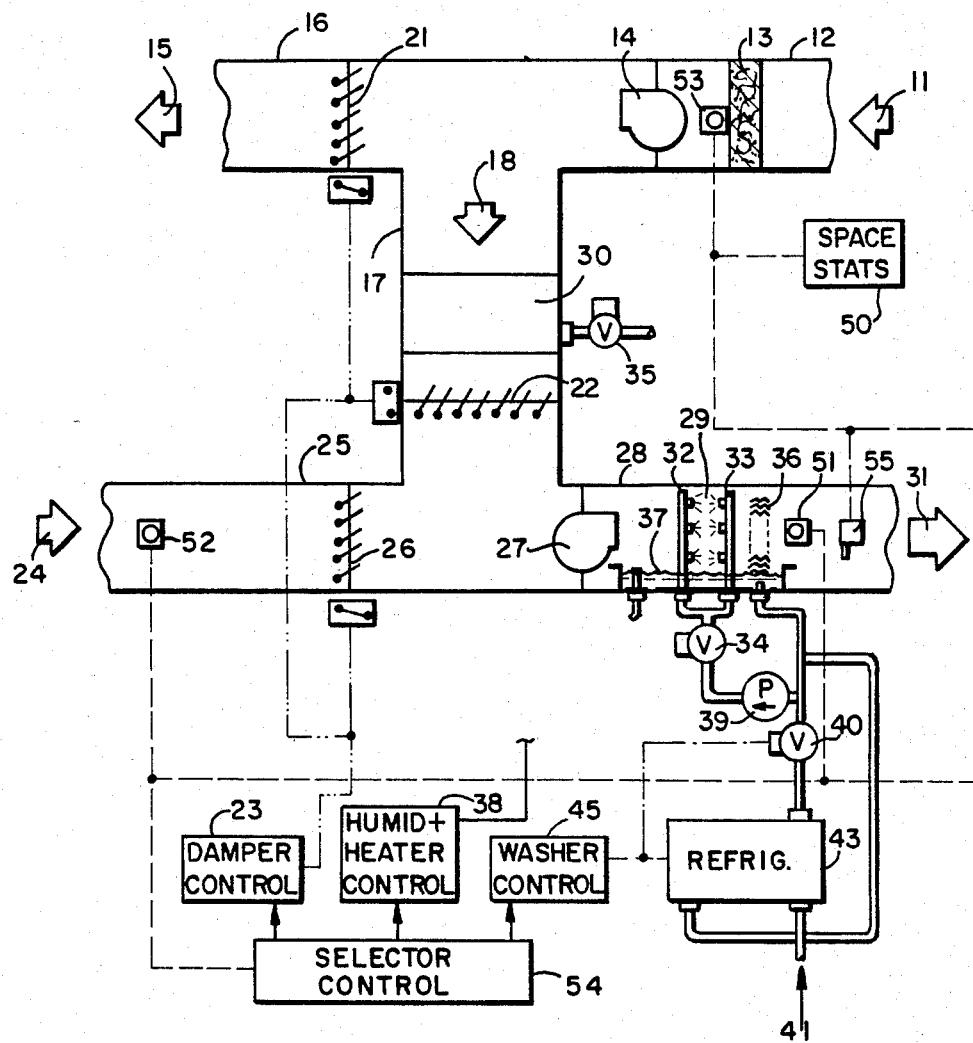
FIG. 1 is a diagrammatic representation of the central unit of an air conditioning system embodying the present invention.

The embodiment of the invention diagrammatically illustrated in the FIG. 1 includes a central air conditioning unit in a system in which return air from a workspace is normally recycled as recirculation air, but may be mixed with more or less fresh air and passed through a single washer to dissipate the room heat added during its passage through the work space. The washer may use recirculated water, or refrigerated water according to the requirements of the ambient conditions. The recirculation air is mixed with fresh air and passed through a washer and humidifier back to the work space. To this end, the return air from the work space, as shown by the arrow 11, is drawn through a return duct 12 having a filter 13 by a recirculating fan 14. A part of the return air is discharged to the atmosphere as indicated by the arrow 15 through a discharge duct section 16, and the remainder is recirculated through a recirculation duct 17 as indicated by the arrow 18. The proportion between recirculated air and exhausted air is regulated by oppositely-acting dampers 21 and 22 respectively in the ducts 16 and 17.

Fresh air 24 is mixed with the recirculated air issuing from the duct 17 by an inlet duct 25 controlled by a damper 26 which is coupled to the dampers 21 and 22 through a common control 23. A blower 27 is provided to drive the mixture of fresh and recirculated air into the primary air duct 28 having a washer section 29. The primary air from the washer 29 is fed to the work space as indicated by the arrow 31 through suitable workspace air inlets (not shown). A heater 30 is provided, in the illustrated system in the duct 17, but the heater 30 alternatively may be located in the duct 28, or in a bypass around the washer section (not shown). In the illustrated system, the heater 30 is a fail-safe device which operates only when there is insufficient heat generated in the work space to overcome the infusion of cold outside air, and is not used in normal operation. To control the added heat, a valve 35 modulates the heater 30 under control of a humidity and heater control 38.

The air washer 29 is of conventional configuration having oppositely-directed sprays 32 and 33 controlled respectively by a spray valve 34. Downstream of these sprays 32 and 33 is a drop collector 36 for obtaining a thorough mixing of the air stream and separating free moisture from the air stream into a sump 37 for recirculation to the spray pump 39. The spray valve 34 is regulated to control the humidification of the air passing through the washer, for example by the humidity and heater control 38.

The humidity and heater control 38 is controlled by the room stats 50, for example a thermostat and a humidistat in the work-space, the thermostat transmitting an output signal inversely proportional to the work-space dry-bulb temperature, and the humidistat transmitting an output signal directly proportional to the work-space relative humidity. The outputs of the thermostat and humidistat are directed through a signal selector control 54 which is operable to put out separate input signals to the humidity and heater control 38 in response to the output signals from the thermostat and humidistat.

The damper control 23 and a washer control 45 are controlled by a discharge dewpoint thermostat 55, the thermostat transmitting an output signal directly proportional to the dewpoint temperature of the air discharged into the work space. The output of the dewpoint thermostat is directed through the signal selector control 54 which is operable to put out separate input signals to the damper control 23 and the washer control 45 in response to the output signal.

In accordance with the invention, the temperature or heat-content of the air is further controlled in response to signals from sensors 51, 52 and 53, by operating either a water inlet valve 40 to the washer, or by operating the dampers 21, 22 and 26. The water inlet valve 40 is provided to supply chilled water to control the temperature of the water in the spray used to humidify the primary air flowing through the duct 28. The water supplied through the valve 40, as indicated by the arrow 41, is preferably from a chill water supply whose temperature is substantially below the temperature of the primary air. To enhance the cooling effect of the sprays 32 and 33, a refrigeration unit 43 is coupled to the water inlet 41, so as to supply refrigerated water. The washer control 45 regulates the operation of these components.

Where the unit 43 supplies only a simple washer, the valve 40 may be omitted since the temperature of the washer water may be controlled through the control 45 by regulating the refrigeration unit 43. When the unit 43 serves additional washers, the unit cools the water to service all of the washers, and the control of individual washers is effected through the control 45 by modulating the valve 40 in each of the washers.

The normal refrigeration unit is a centrifugal-type chilled-water refrigeration unit. Such machine requires 10 to 20% cooling load to operate the machine safely and effectively, and thus the water inlet 41 is adjusted or a bypass is provided to assure sufficient flow through the refrigeration unit 43 when this unit is operating. Manipulating the dampers by the control 23 controls the mixture of fresh air with recirculated air, and the control 45 affects the cooling effect of the washer. If it is necessary to heat the washer air 31, the heater 30 is actuated by the control 38 in response to a high signal output in the selector control 54.

In accordance with the invention, the selector 54 is effective to achieve the desired control of the work space conditions and the sensors 51, 52 and 53 provide signals to compensate for undesired effects caused by various changes in the operating or ambient conditions. The sensor 51 is in the outlet from the duct 28 to sense the condition of the discharged washer air 31 and preferably the sensor is responsive to the enthalpy of the air. The sensor 52 is in the duct 25 and is responsive to the enthalpy of the outside air 24. The sensor 53 is in the recirculation duct 12 and is responsive to the recirculating air 11. The signals from each of the sensors 51, 52 and 53 are fed into the selector control 54 for comparison and for selecting and modulating the input signals to the damper control 23 and washer control 45.

Since the system is designed for ventilating and conditioning a work space which includes operating machinery and lighting which generates a substantial amount of sensible heat, the enthalpy of the air 11 sensed by the sensor 53 is normally higher than the enthalpy of the discharged air 31 sensed by the sensor 51. When the factory or work space is operating under constant conditions, the change in enthalpy between the air 31 and the air 11 is relatively constant. However, when the operations are shut down for a period, the amount of heat added to the air in the work space is reduced thereby reducing the differential between the enthalpy of the air at 31 and 11. Conversely, when there is a substantial increase in activity or lighting, the differential enthalpy between the air 31 and the air 11 is substantially higher. There can be a negative differential only when there is an infusion of cold air into the work space which is sufficient to dissipate the heat which is normally generated within the work space.

The enthalpy of the outside air, on the other hand, is independent of the enthalpy of the air at 11 and 31. The enthalpy of the outside air 24 may be less than the enthalpy of both the return air 11 and the washer air 31, which is a typical occurrence in cold weather. It may be above the enthalpy of the washer air 31 and below the enthalpy of the return air 11, for example in mild weather. Likewise, it may be above the enthalpy of both the washer air 31 and the return air 11, usually in hot weather. The latter occurrence is normal for summer operations.

Normally in a system such as shown in FIG. 1, the refrigerating unit 43 is activated during the summer months when it is likely that the enthalpy of the outside air 24 is above the enthalpy of the washer air 31. In systems prior to the present invention, the refrigerating unit 43 is activated and inactivated by an outdoor wet bulb signal with a fixed setpoint or manually in accordance with the change in seasons, and also when there is an abnormal change in outside air temperature. In such systems, the operators must be alert to the change in outdoor air temperature and changes in conditions within the work space so that the refrigeration unit 43 may be shut down when there is insufficient load on the unit to insure safe operation. To prevent freeze-ups or other damage to the refrigeration unit, it is desirable to maintain a minimum load on the unit at all times during its operation so that it is unnecessary to rely upon the safety controls or upon close supervision by the plant operators to shut down the equipment when the refrigeration load is below a safe operating level.

In accordance with the present invention, the operation of the system is controlled in an efficient manner in response to the enthalpy level of the outside air relative to the levels of the washer air 31 and the return air 11. When the enthalpy of the outside air 24 is above the enthalpy of both the washer air 31 and the return air 11, the system is controlled so that the outside air damper 26 and the return exhaust damper 21 are closed and the recirculating damper 22 is fully opened. The refrigeration unit 43 is maintained in operation, the dewpoint thermostat 55 puts out a signal to modulate the refrigerated water valve 40 and/or the operation of the unit 43, and the room stats 50 put out signals to modulate the washer water and heater to maintain the desired temperature within the work space. At the other extreme, when the enthalpy of the outside air 24 is always below the enthalpy of the washer air 31 and the return air 11, the refrigerating unit 43 is shut down and the dewpoint thermostat 55 controls the dampers and the room stats 50 control washer water and heater to maintain the desired temperature in the room. The humidity may be controlled for example as disclosed in U.S. Pat. No. 4,399,864, the disclosure of which is incorporated herein by reference.

The present invention is designed to maintain efficient operation as the enthalpy of the outside air moves between these limits in both directions. The control of the present invention is particularly effective for energy conservation because it senses the enthalpy of the air at the various points in the system and modulates the controls in accordance with the actual enthalpy rather than in accordance with a desired set point which may or may not be achieved. Thus where the system has been in use for a considerable period without a periodic shut down for overall refurbishment, the individual components of the system may be operating at different efficiencies and thus adjustments to the controls relative to fixed set points, based on theoretical projections of the results of such adjustments, are not accurate because of a changing condition in the components of the system. Particularly where it is necessary to maintain precise humidity and temperature within the work space, inefficiencies may arise if the controls are adjusted against set points rather than against actual readings of the condition of the air in the system. Thus the present invention senses the actual enthalpy of the air entering the central unit at 11 along with the enthalpy of the washer air 31 exiting the central unit and the enthalpy of the outside air 24. The necessary changes in the operation of the system are thereby responsive to actual changes in the condition of the air.

In accordance with the invention, the selector control 54 modulates the damper and washer controls 23 and 45 to assure energy-efficient operation of the central air conditioning unit. When the outdoor enthalpy sensed at 52 is normally above the return air enthalpy sensed at 53, the refrigerating unit 43 functions to cool the washer water sufficiently to reduce the temperature and enthalpy of the return air which is totally recirculated through the duct 17. The dewpoint thermostat 55 provides a signal which would ordinarily modulate the dampers and the washer as needed to precisely maintain the desired conditions of the air discharged into the work space. However, the sensors confine the adjustment to the washer, except under special conditions, to minimize the enthalpy of the air entering the washer.

When the enthalpy of the outside air 24 falls below the enthalpy of the return air 11, but remains above the enthalpy of the washer air 31, the selector control 54 provides a signal to the damper control to enable the substitution of fresh outside air for the recirculating return air. Thus the enthalpy of the washer air 31 is first reduced by introducing outside air rather than by cooling the return air in the washer thereby reducing the load on the refrigerating unit 43 and conserving energy.

As the enthalpy of the outside air 24 reduces further, the load on the refrigeration unit is reduced further, and eventually the cooling effect in the washer may be achieved by simple evaporative cooling, enabling the refrigerating unit 43 to be turned off completely. If the fluctuations in the outside air enthalpy are sufficiently great, rather than turning off the unit 43, it may be desirable to maintain the refrigeration unit functional and operating at its minimum load condition. Such operation may reduce the enthalpy of the washer air 31 below the desired level, and if this occurs, the present invention provides an auxiliary signal to the damper control so that it is actuated to reduce the amount of outside air and increase the amount of return air 11 which is passed through the damper 22, thereby to elevate the enthalpy of the washer air 31, maintaining the discharged washer air at the desired level. The maintenance of a minimum load on the refrigeration unit may be assured by providing an auxiliary signal to the control 23 for the dampers to recirculate some air 11 whenever the washer control signal passes a predetermined set point.

Normally most energy-efficient operation is achieved by utilizing either one of the return air and the outside air which has the lowest enthalpy when the refrigerating unit is functioning. Thus the damper control is either fully opened or fully closed by the enthalpy-sensor signals when the refrigerating unit is operating. However, when the refrigerating unit is cut off or is operating at a minimum preset load, the dampers are modulated by an auxiliary signal to effect the desired control of the washer air.

When the enthalpy of the outside air is normally below that of the washer air, the dampers are controlled so that only outside air is passed through the washer. When passing the outside air through the washer, and it is desired to reduce the chilling effect of the washer, the chilled water valve 40 may be closed or adjusted for minimum cooling. However, when the washer discharge enthalpy is less than the return air enthalpy and the operation of the system modulates the washer control to reduce the washer control to a point where the cooling process through the washer is adiabatic, the discharged washer air 31 has the same enthalpy as the outside air 44 entering the washer. Further reduction of the outdoor air enthalpy then may reduce the washer air enthalpy to a point where it is ineffective to maintain the work-space conditions desired. In such case, the controls of the present invention provide an auxiliary signal which modulates the damper controls to mix recirculated return air with the outdoor air entering the washer to thereby increase the enthalpy of the washer air 31 above the enthalpy of the outdoor air 24.

Under the reverse conditions, with the outdoor air enthalpy below the washer air enthalpy, the control will provide for total evaporative cooling in the washer or else operation of the refrigeration unit at minimum level, along with modulation of the dampers to regulate the washer air enthalpy. The dewpoint thermostat 55 provides a signal which would ordinarily modulate the washer valve and the refrigeration unit to maintain the desired conditions in the work area. However, the washer signals are rendered ineffective unless special conditions are sensed by the dewpoint thermostat 55 which require the application of an auxiliary signal to activate the washer signals.

If the enthalpy of the outside air increases, and becomes greater than the enthalpy of the washer air, most efficient operation is achieved if the outside air dampers are fully opened and the control of the washer air output is adjusted by signals to the washer 45 to actuate the valve 40. If the outdoor air enthalpy then drops to equal the washer air enthalpy, or the washer air enthalpy rises to equal the outdoor air enthalpy, the chill water valve is closed, or if the refrigerating unit 43 is operating to its minimum flow condition, so that the washer operates primarily on recirculated washer water in response to signals from the room stats and the dewpoint thermostat and only evaporative cooling is effected. In this situation, control of the conditions of the discharged air reverts to the damper controls. When the enthalpy of the outdoor air rises above the enthalpy of the return air, the selector control fully closes the outside air damper and opens the return air damper and the control of the condition in the space continues to be effected by modulating the washer controls and activating the refrigeration unit.

When the outdoor air enthalpy rises above the return air enthalpy, the outdoor air dampers are closed and the return air is recirculated through the washer. In such event, if the refrigeration load decreases to the minimum, for example caused when the heat-generating units in the work area are turned off, an auxiliary signal is provided to open the fresh air dampers to introduce outside air to mix with the recirculating air and thereby maintain the minimum load on the refrigeration system while maintaining the desired conditions in the work space.

Figure 2:
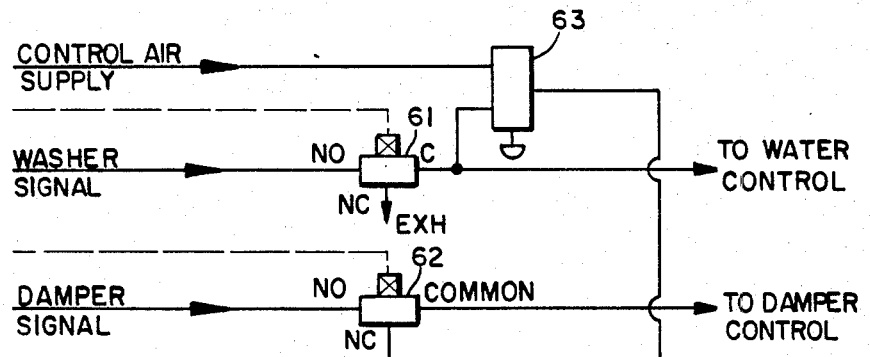
FIG. 2 is a diagrammatic view of a suitable arrangement of regulators which may be incorporated in the unit shown in FIG. 1.
Figure 3:
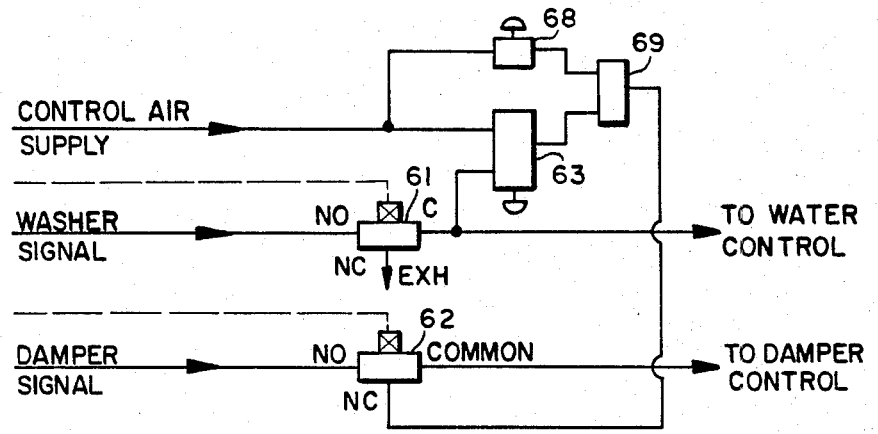
FIG. 3 is a view similar to FIG. 2 showing regulators which may be used to maintain the desired output of the central unit when a refrigerating component of the system would otherwise adversely affect the conditioning effect of the air exiting the central unit.
Figure 4:
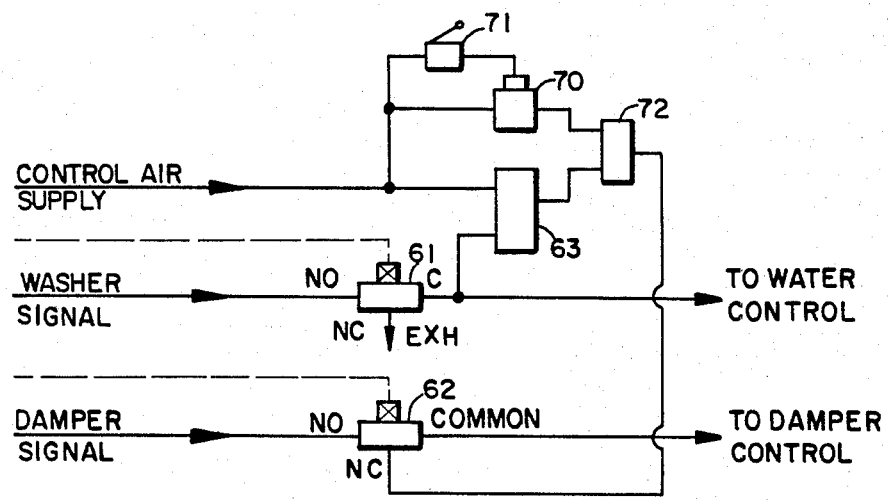
FIG. 4 is a view similar to FIGS. 2 and 3 showing an arrangement of regulators to maintain the refrigeration unit at its minimum level of safe operation.

For the purpose of illustration, FIGS. 2-4 illustrate pneumatic controls which may be incorporated in the selector control to achieve these results. FIG. 2 shows a pneumatic system in which a control air supply is utilized to provide an auxiliary signal to operate the damper control when the enthalpy sensors call for the damper controls to be inoperative. In this figure, an electric-pneumatic three-way control valve 61 is placed between the washer signal and the washer control. As shown, the valve 61 is normally-open with its common port downstream and its normally closed port open to exhaust. A similar electric-pneumatic three-way control valve is placed between the damper signal and the damper control with the normally-closed port connected to the output port of an adding/subtracting repeater 63.

The valve 61 is energized whenever the enthalpy of the outside air 24 is below the enthalpy of the washer air 31. This connects the common to exhaust and maintains the washer valve 41 in its closed or minimum-flow condition. When the outdoor air enthalpy rises above the washer air enthalpy, the valve 61 is de-energized thereby connecting the washer signal to the washer control for modulation of the valve 41 and/or the refrigeration unit 43. De-energization of the valve 61 is accompanied by energization of the valve 62 when the enthalpy of the outdoor air rises above the washer air enthalpy thereby divorcing control of the washer air from modulation of the dampers.

Further elevation of the outdoor air enthalpy to a level above the enthalpy of the recirculating air 11 will de-energize the valve 62 to restore the normal dual control of the washer air by both the washer signal and the damper signal. The damper signal operates to open the outside air damper and close the return air damper when a full 20 p.s.i. signal is applied to the control 23 and will reverse this condition when the minimum signal is applied.

In the control arrangement shown in FIG. 2, a control air signal of 20 p.s.i. is applied to the one port of the repeater 63 and the washer signal through the normally-open valve 61 is applied to the other port. If the washer signal is at a minimum, a full 20 p.s.i. is applied to the normally closed port of the solenoid valve 62 to thereby fully open the outside air damper 26 and close the return air damper 22. If the outdoor air enthalpy decreases relative to the washer air enthalpy, the washer signal is increased which reduces the output of the repeater 63 and modulates the fresh air damper closed so as to avoid the condition discussed above which would occur when the washer provides adiabatic cooling of the outside air and permits the washer air enthalpy to fall below the necessary level to maintain the desired work space conditions. Thus the repeater operates to provide an auxiliary signal to modulate the dampers to prevent loss of effectiveness of the washer air control. The relay is adjusted so that the output pressure is equal to the difference between the required pressure to fully open the fresh air damper and the pressure required to fully close the chilled water valve. In this way, the fresh air damper is actuated by the output signal whenever the washer signal is at the level to fully close the chill water valve. When the washer signal is effective to open the chill water valve, the output from the repeater 63 applies a pressure to the normally closed port of the valve 62 to maintain the fresh air dampers fully opened and the return air dampers fully closed. When the outdoor air enthalpy decreases to approach the level of the washer air enthalpy, the washer air enthalpy may decrease, and, if this occurs, the thermostat 55 reduces the washer signal which, through the repeater 63 provides a signal through the valve 62 to modulate the dampers to raise the washer enthalpy relative to the outdoor air enthalpy and maintain the desired work space conditions. As the washer air enthalpy rises above the outdoor air enthalpy, the valve 61 is energized again and the valve 62 is de-energized. This thereby enables the controls to operate most efficiently without adversely affecting the conditioning effect in the work space.

An alternative arrangement of regulators is shown in FIG. 3 which assures a safe minimum operating level on the mechanical refrigeration unit 43. To this end the valves 61, 62 and 63 are utilized in the same arrangement as set forth in FIG. 2, but to assure a minimum load on the refrigeration unit 43, a pressure reducing valve 68 is placed in parallel with the adding/subtracting relay 63 and the output signals from the valve 68 and the relay 63 are input into a higher-pressure selector 69 whose output goes to the normally-closed port of the electric-pneumatic valve 62. The pressure reducing valve 68 is adjusted so that when the valve 62 is energized it is possible to provide a signal to partially open the return air damper and partially close the fresh air damper, adding sufficient heat to the air passing through the washer to maintain a minimum load on the refrigeration equipment 43. Thus the valve 68 provides a minimum signal to the normally-closed port of the valve 62 to maintain the return-air dampers sufficiently open to maintain a load on the refrigeration equipment. The relay 63 then, through the selector 69, provides a signal which overrides the minimum signal to close the return air damper and fully open the fresh air damper when the washer signal rises to modulate the valve 41 towards its fully-open position. Thus the reducing valve 68 provides an auxiliary signal establishing a preset level for maintaining a load on the refrigeration unit 43 when the washer signal calls for a reduction or closure of the washer control valve 41 and/or shut-down of the refrigeration unit 43.

With the regulator arrangement of FIG. 3, if the conditions in the work space fluctuate throughout a wide range, the preset load on the refrigeration unit may prove inefficient and unsatisfactorily responsive to the conditions in the work-space. Accordingly a regulation system is provided in FIG. 4 which responds to the actual load on the refrigeration unit 43 rather than being responsive to a preset load as shown in FIG. 3.

In the system of FIG. 4, a chilled-water refrigeration-unit-load transmitter 71 is coupled to the refrigeration unit to sense the load on the unit. The transmitter may be a mechanical-to-pneumatic transmitter which senses the position of the refrigeration inlet-vane control lever, or a pneumatic-to-pneumatic device to sense the control signal going to the chilled-water-capacity control actuator, or an electronic-to-pneumatic unit to sense the control signal going to the electronic chilled-water-capacity control actuator. The output signal from the transmitter 71 is led to a modulating relay 70 to adjust its output. In the embodiment of FIG. 4, the output of the relay 70 is reduced as the refrigeration load is reduced. The output of the relay 70 is led to one port of the lower-pressure selector relay 72 for comparison with the signal received from the adding/subtracting relay 63. The lower pressure of the two signals is transmitted to the normally closed port of the solenoid valve 62 to provide an auxiliary signal for actuating the dampers as required.

In operation, the system of FIG. 4 senses a reduction in the load on the refrigeration unit to its minimum performance level so as to reduce the pressure output from the relay 70. This reduced pressure is then transmitted through the lower-pressure selector 72 to the damper control through the valve 62 to modulate the fresh air dampers closed and return-air dampers open, thereby directing warmer air through the washer to maintain the load on the refrigeration unit 43 at or above the minimum performance level. The adding-/subtracting relay 63 also may provide an auxiliary signal to modulate the dampers in the event the outdoor air enthalpy decreases as described in connection with FIG. 2.

Thus the present invention provides a novel control system which is effective to achieve maximum energy-efficiency in the operation of a central air conditioning unit. The system is particularly effective for use in systems for accurately controlling the temperature and humidity of work spaces which normally add sensible heat to the air circulated through the space, and in which there may be substantial fluctuations in the amount of sensible heat added to the air, the outdoor air conditions, or the operating conditions of the apparatus. The invention enables highly efficient operation of the air conditioning system with a minimum expenditure for parts and equipment.

While particular embodiments of the present invention have been herein illustrated and described it is not intended to limit the invention to such disclosure but changes and modifications may be made therein and thereto within the scope of the following claims.

We claim:

1. In an air conditioning system to maintain a selected temperature and humidity in a work space, said system having an air washer with an inlet connected to recirculated-air and outside-air ducts and an outlet connected to work-space inlets, damper means in said ducts having a controller to proportion the recirculated and outside air admitted to said washer, throttling means to modulate the flow of water through said washer; cooling means coupled to said washer to modulate the cooling effect of said washer; and means responsive to the dew-point temperature of the air passing through said washer outlet and responsive to the humidity and the temperature in said work space transmitting input signals to said damper control, to said throttling means and to said cooling means to modulate the temperature and the moisture content of the washer air issuing from said outlet; the improvement comprising sensors to generate enthalpy signals indicating the levels of enthalpy of the recirculated air, the outside air, and the washer air issuing from said outlet respectively; and a selector control receiving said enthalpy signals and operable to selectively interrupt the transmission of said input signals to said damper control and to said cooling means and selectively operable to transmit an auxiliary signal to said damper controller to control said dampers when its input signal is interrupted.

2. A system according to claim 1 where interruption of said input signal to said cooling means minimizes the cooling effect of said cooling means, and said selector control interrupts said cooling-means signal when the outdoor-air enthalpy is below said washer-air enthalpy.

3. A system according to claim 1 wherein said selector control interrupts the transmission of said input signal to said damper control when the enthalpy of the outside air is less than the enthalpy of the recirculated air and greater than the enthalpy of the washer air, and said damper control is effective to normally maintain said recirculated-air dampers closed and said outside-air dampers open during said interruption.

4. A system according to claim 3 including a regulator for said auxiliary signal to modulate said signal to open said recirculated-air damper and close said outside-air damper upon transmission of an input signal to said cooling means to minimize the cooling effect of said washer.

5. A system according to claim 4 wherein said system includes means to assure a sufficient auxiliary signal to said damper control to open said recirculated dampers and maintain a predetermined load on the cooling means whenever the auxiliary signal reaches a pre-set limit.

6. A system according to claim 4 wherein said cooling means comprises a refrigerating unit and said system includes a transmitter coupled to said unit to provide said auxiliary signal when the output of the unit is modulated below a selected cooling load.

7. A system according to claim 1 wherein said cooling means comprises a cool water inlet valve for introducing cool water to the washer and a refrigeration unit for introducing refrigerated water to the cool water inlet valve.

8. A system according to claim 7 wherein said refrigeration unit operates continuously to supply chilled water to the valve, and upon demand for additional cooling of the washer air, said input signal to the cooling means modulates the valve toward its fully open position and conversely upon reduction of the cooling demand in the work space said input signal modulates the valve toward its closed position.

9. A system according to claim 1 wherein said cooling means comprises a cool water inlet for introducing cool water into the washer and a refrigeration unit for introducing refrigerated water to said inlet.

10. A system according to claim 9 wherein, said refrigeration unit operates continuously at least at a minimum cooling load assuring sufficient water flow through the refrigeration unit to maintain a minimum load on said unit, and, upon demand for additional cooling in the space, said input signal increases the cooling of the refrigeration unit and conversely upon reduction of the cooling need in the work space first reduces the cooling of the refrigeration unit toward said minimum cooling load.

11. A method of maintaining a selected temperature and humidity in a work-space comprising the steps of generating output signals responsive to the temperature and the humidity of the work space and the dewpoint temperature of the air discharged into said work space, withdrawing recirculation air from said work space, providing outside air, proportioning said recirculation air and said outside air and driving said proportioned air through an air washer, discharging washer air leaving the washer into the work space, cooling the water in the air washer to control the temperature of the washer air, using said output signals to generate input signals to modulate said proportioning and said cooling to maintain the desired condition in the work space, sensing the enthalpy levels of the recirculation air, the outside air and the washer air, selectively interrupting the modulation of said proportioning and the modulation of said cooling by said input signals in response to the sensed enthalpy levels, and providing an auxiliary signal to selectively modulate said proportioning when modulation of said proportioning by said input signals is interrupted.

12. A method according to claim 11 wherein the modulation of said cooling by said input signals is interrupted when the sensed enthalpy level of the outside air is less than the enthalpy level of the washer air.

13. A method according to claim 11 wherein the modulation of said proportioning by said input signals is interrupted when the enthalpy level of the fresh air is below the enthalpy level of the recirculation air and above the enthalpy level of the washer air.

14. A method according to claim 13 wherein interruption of said proportioning by the input signals results in maximizing the proportion of outside air and minimizing the proportion of recirculated air.

15. A method according to claim 14 wherein said auxiliary signal increases the proportion of recirculated air when one of the input signals modulates the cooling so that it approaches its minimum cooling effect to thereby increase the need for the cooling effect and maintain at least a selected minimum cooling effect in the washer.

16. A method according to claim 15 wherein said cooling is effected by a refrigerating unit and including the step of sensing the load on the refrigerating unit and providing the auxiliary signal when the sensed load approaches a minimum level.

17. A method according to claim 15 wherein, when the enthalpy of the washer air falls below that necessary to maintain the desired conditions in the work space, the auxiliary signal increases the amount of recirculated air.

* * * * *